May 29, 1928. C. SKLAREK Re. 16,979
DIRIGIBLY MOUNTED LIGHT
Original Filed Feb. 18, 1922 2 Sheets-Sheet 1
Fig. 1.
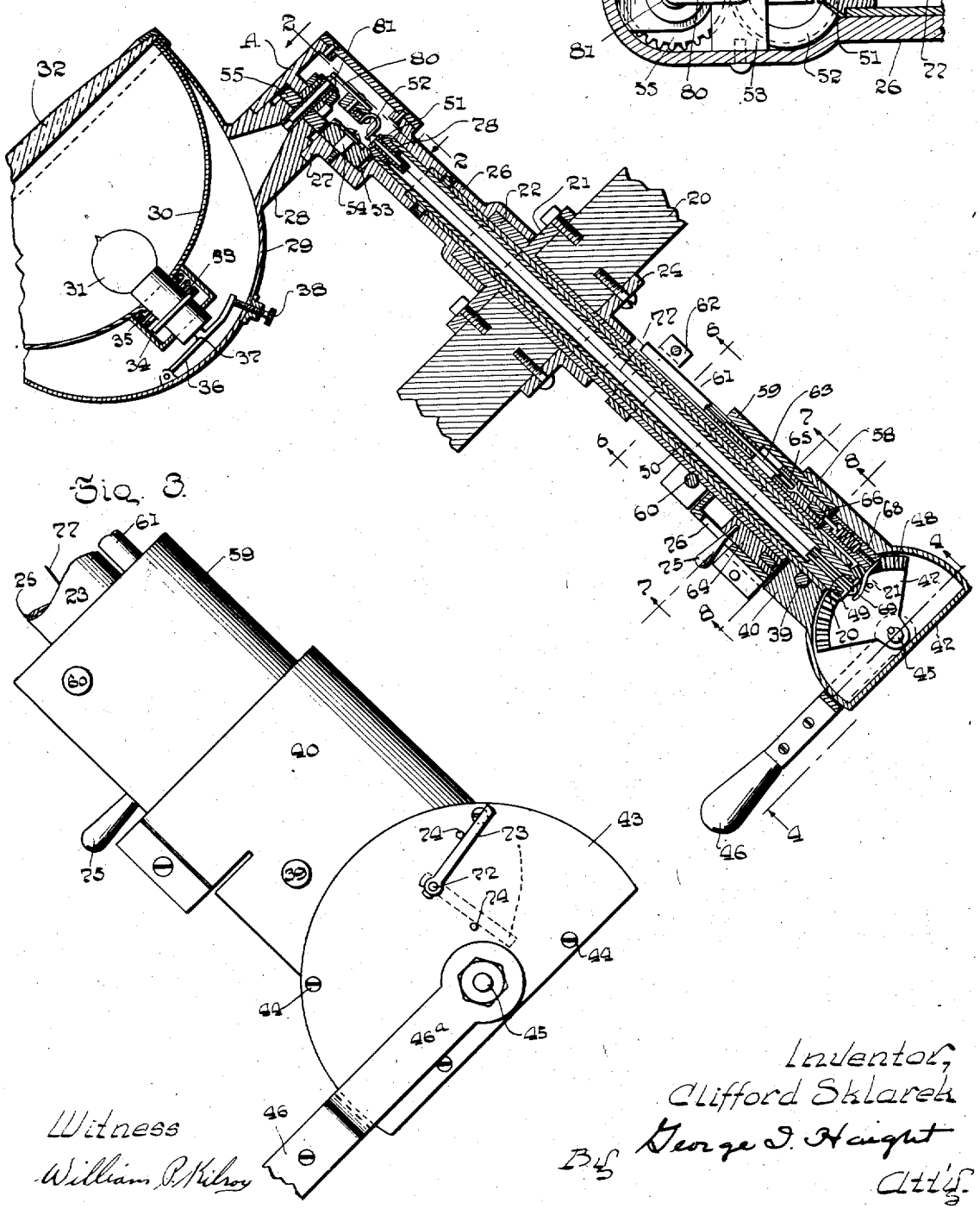
Fig. 2.
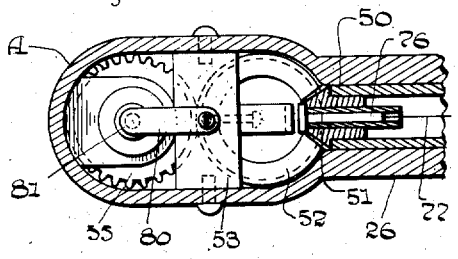
Fig. 3.
Witness
William P. Kilroy
Inventor,
Clifford Sklarek
By George D. Haight
Att'y.

May 29, 1928. Re. 16,979

C. SKLAREK

DIRIGIBLY MOUNTED LIGHT

Original Filed Feb. 18. 1922 2 Sheets-Sheet 2

Inventor,
Clifford Sklarek
By George T. Haight
Atty.

Witness
William P. Kilroy

Reissued May 29, 1928. Re. 16,979

UNITED STATES PATENT OFFICE.

CLIFFORD SKLAREK, OF CHICAGO, ILLINOIS, ASSIGNOR TO INTERNATIONAL SPOTLIGHT CORPORATION, OF CHICAGO, ILLINOIS, A CORPORATION OF ILLINOIS.

DIRIGIBLY-MOUNTED LIGHT.

Original application filed February 18, 1922, Serial No. 537,390. Renewed August 28, 1925. Original No. 1,578,930, dated March 30, 1926. Application for reissue filed March 24, 1928. Serial No. 264,477.

This invention relates to improvements in dirigibly mounted lights.

One object of the invention is to provide a universally adjustable light involving mechanism of simple, durable and substantial construction and so arranged that the adjustment may be effected easily, the arrangement being especially adapted for spotlights to be employed on automobiles.

Another object of the invention is to provide, in a dirigibly mounted light, a control switch or switches for the electric circuit of a noved and efficient character and which may be actuated by the same hand of the operator used in effecting the adjustments of the light and without shifting of the position of the hand.

Other objects of the invention are to provide an adjustably mounted spotlight having the parts thereof so designed that they may be economically manufactured and assembled and the parts applied to a vehicle with a minimum of effort and instruction.

Figure 4:
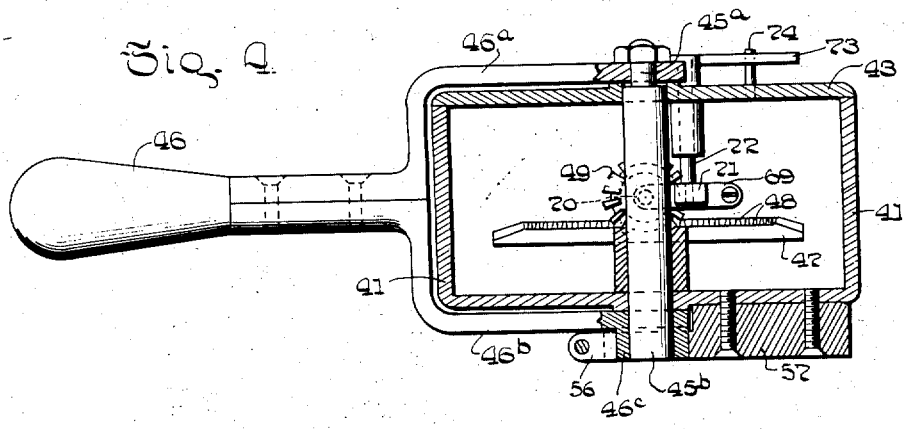
Figure 6:
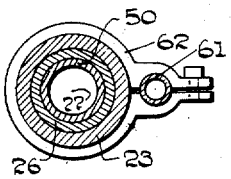
Figure 7:
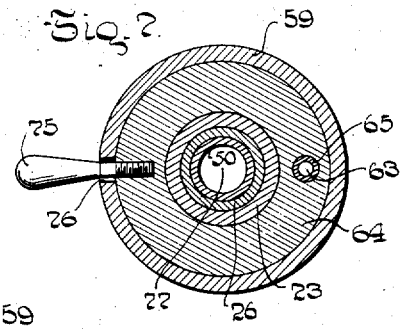
Figure 8:
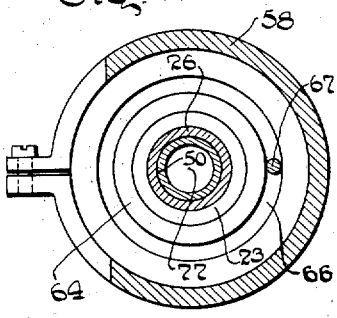
Figure 5:
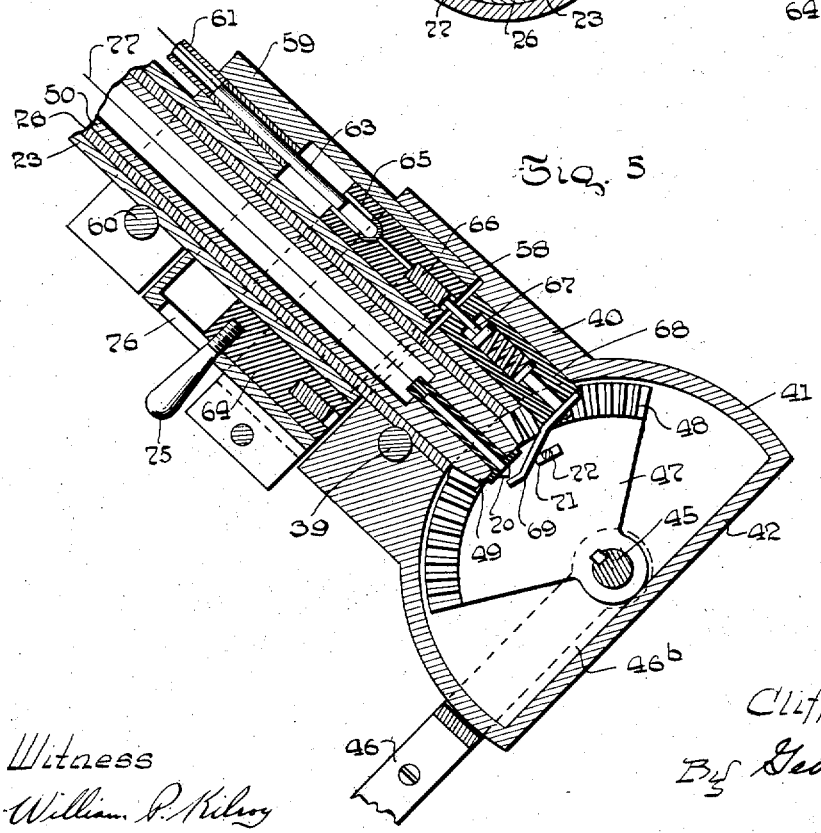

In the drawings forming a part of this specification, Figure 1 is a vertical sectional view taken through the corner post of a closed type of automobile superstructure and showing my improvements in connection therewith. Figure 2 is a horizontal, sectional view, upon a larger scale, corresponding to the line 2—2 of Figure 1. Figure 3 is an enlarged side elevational view of the inner end of the mechanism adjacent the steering wheel. Figure 4 is a sectional view corresponding to the section line 4—4 of Figure 1, but upon a larger scale. Figure 5 is a view similar to Figure 1 but upon a larger scale, illustrating certain of the parts at the inner end of the mechanism, and more particularly certain electrical connections and switch. And Figures 6, 7 and 8 are sectional views corresponding to the lines 6—6, 7—7 and 8—8, respectively, of Figure 1 but upon a larger scale.

In said drawings, 20 indicates a corner post of the superstructure of a closed type of automobile or other part of the superstructure such as a windshield or the like and to which my improved light is adapted to be attached. In the instance shown, the spotlight is primarily designed for use on closed types of cars and is readily accessible for operation from the interior at a point convenient to the driver and in proximity to the usual steering wheel.

In carrying out my invention, I employ a bracket 21 adapted to be secured to the corner post 20 by screws or other suitable fastening devices. Said bracket 21 is provided with an outstanding hub or bearing sleeve 22 and with an inwardly extending elongated bearing sleeve 23 passing through a corresponding opening made in the end post 20. Preferably, I also employ a supplemental bracket 24 on the inside of the post 20 and secured thereto, said bracket 24 having a short supporting hub 25, as shown in Figure 1.

Rotatably mounted with respect to the supporting bracket 21 and on an axis extending approximately horizontally, is what may be termed generically a housing or hollow head A, the latter as shown, having a hollow cylindrical arm or shaft 26 comprised of a short integral section and a tube rigidly secured thereto. Said arm 26 extends laterally from the head A and within the bearing provided therefor by the sleeve portions 22 and 23 of the bracket 21, said arm 26 being extended inwardly beyond the end of the sleeve 23, as best shown in Figures 1 and 5. With this arrangement, it is evident that the member A is adapted to rotate about a horizontal axis to thereby effect adjustment of the light in one plane.

The housing A has also an integrally formed cylindrical flange 27 extending from one side thereof and at right angles to the hollow arm 26. Said flange 27 provides a shouldered bearing for a lamp-carrying member 28 to which is secured a casing 29.

The casing 29 is provided on the interior thereof with a reflecting mirror 30, an electric lamp bulb 31, and the usual lens 32. The base of the electric bulb is slidably mounted within a suitable casing 33, the base having a flange 34 between which and the mirror is an expansion spring 35. Pivoted to and within the casing or shell 29 is a lever 36 having a projection 37 bearing upon the inner end of the base of the bulb, said lever being adjustable from the exterior of the shell 29 by a knurled adjusting screw 38. With this arrangement it is evident that the focus of the electric bulb can be adjusted without dismantling any of the parts and also that the lamp-carrying member is rotatable on the housing A about an axis at right angles to the axis of rotation of the housing A, thereby providing for the universal adjustment of the light, as will be obvious.

Rigidly secured to the inner extended end of the hollow arm 26 as by a pin 39, is a preferably cast block or handle support 40, said block 40 having a hollow semi-cylindrical box, the arcuate walls of which are indicated at 41 and the flat wall at 42. Said box is adapted to be closed by a suitable cover plate 43 secured in place by screws 44 or other suitable fastening devices.

Mounted in said semi-cylindrical box is a transversely extending shaft 45 having suitable bearings in the bottom wall and cover plate of the box and extended both above and below. Said shaft 45 is rotatable about an axis perpendicular to the axis of the rotatable hollow arm 26, as clear from an inspection of Figure 1.

The upper end of the shaft 45, as viewed in Figure 4, is of reduced cross section as indicated at $45^a$, the lower extended end $45^a$ remaining of the same diameter as the major portion of the shaft 45. Rigidly secured to the extended portions $45^a$ and $45^b$ of the shaft 45 are the inner ends of a forked hand lever 46 which consists of an upper half $46^a$ and a lower $46^b$. It is evident that oscillation of the handle 46 will produce a like oscillation of the shaft 45 within the box.

Rigidly secured to the shaft 45 within said hollow box and near the bottom of the shaft, is a segmental plate 47 having a series of teeth 48 providing a segmental gear, the latter cooperating with a bevel gear 49 rigidly secured to the inner end of a hollow shaft 50 which extends through and is rotatable within the hollow arm or shaft 26.

The opposite end of said hollow shaft 50 has rigidly secured thereto and extending within the housing A, a bevel gear 51 which meshes with a bevel gear 52 formed on the top of and preferably integral with a pinion or gear 53 rotatably mounted on a stud 54. The gear or pinion 53, in turn, meshes with a second gear or pinion 55 integral or rigid with the adjacent end of the lamp-holding member 28. With this arrangement, it is evident that oscillation of the hand lever 46 about the axis provided by the shaft 45, will produce a corresponding rotation of the lamp-holding member 28 about its axis on the housing A.

Furthermore, swinging of the hand lever 46 bodily in a plane perpendicular to the axis of the hollow arm 26 will produce rotation of said hollow arm 26 and housing A about the axis of rotation of the latter, thus obtaining the universal adjustments of the lamp proper by the manipulation of a single element. It will be further observed that the two separate adjustments referred to may be obtained in sequence or simultaneously and combined.

To prevent rotation of the lamp-holding member 28 about its particular axis accidentally, as from jarring or vibration, the lower member $46^b$ of the lever handle is provided with a hub $46^c$ with which frictionally cooperates a split friction band 56 carried by a block 57 which is secured to the under side of the block 40, as best illustrated in Figure 4.

To prevent accidental rotation of the housing A about its particular axis, as a result of vibration or jarring, the block 40 is provided with a split sleeve extension 58 which frictionally cooperates with a lead-in block 59, the latter rigidly secured to the bearing sleeve 23, as by the pin 60.

To supply the electric current to the bulb 31, I preferably use the grounded system and the following wiring and switch controls, the current being supplied from any suitable source of power on the vehicle, as for instance the storage battery. The positive side of the circuit is brought from the battery by a wire insulated within the cable 61, the latter being secured in position by a friction clamping band 62, to the fixed bearing sleeve 23 and preferably adjacent the bracket member 24. The end of said wire 61 is led within the lead-in block 59 and there connected to an insulated pin 63 extended parallel to the sleeve 23. Slidably mounted back and forth parallel to the sleeve 23 within the lead-in block 59 is a block of insulation 64 which, on the side in alinement with the pin 63, carries a yieldably female contact element 65 cooperable with the extended end of the pin 63 in all positions of the insulated block 64. The female contact member 65 is in turn electrically connected with an annular contact ring 66 mounted in the block of the insulation 64 with which is adapted to co-operate a spring-pressed contact pin 67 mounted in an insulated bushing 68 carried by the block 40. The pin 67 is in turn electrically connected with a spring finger 69 extending within the semi-cylindrical box 41—43 and opposite to a contact pin 70 mounted in an insulated bushing carried by the adjacent end of the hollow shaft 50. The spring finger 69 normally tends to move away from and out of contact with the pin 70 but is adapted to be forced into electrical contact with the other by means of a cam block of insulating material 71 secured to the bottom end of a shaft 72, rotatably mounted in a suitable bearing provided on the cover plate 43, the upper end of said shaft 72 having an operating finger or lever 73. The latter is movable through an arc of approximately 90° between limiting pins 74—74, as best shown in Figure 3. By swinging the finger 73, it is evident that the spring finger 69 can be moved into or allowed to move out of contact with the contact finger 70. The block of insulation 64 is adapted to be shifted in order to break the circuit between the ring 66 and pin 67 by a finger piece 75 rigid with the block 64 and extending outwardly through a slot 76 in the block 59. In this manner I provide two control switches, either of which may be employed as found most convenient by the operator and depending upon the position of his hand at the time he desires to make or break the circuit.

From the pin 70 is extended a wire 77 connected to a contact pin 78 mounted in a bushing of insulation at the inner end of the hollow shaft 50. Cooperable with the contact pin 78 is a spring finger 79 insulated from the housing A and electrically connected with a second spring finger 80 which bears upon the upper end of a contact pin 81 mounted in a bushing of insulation carried by the lamp-holding member 28. From the pin 81 is extended a wire leading to the positive contact point at the base of the bulb 31. With this arrangement it is evident that the electrical circuit may be maintained with the bulb regardless of the position to which the light is adjusted. It will also be noted that the electric wiring is weather protected throughout and there are no wires which may be twisted, regardless of the operation which takes place.

I have herein shown and described what I now consider the preferred manner of carrying out my invention but the same is merely illustrative, and I contemplate all changes and modifications that come within the scope of the claims appended hereto.

I claim:—

1. In a dirigible light, the combination with a support; of a member rotatably mounted on said support to turn thereon; a second member mounted on said first member to turn thereon about a different axis; and means for effecting independent rotation of each of said members about its respective axis, either simultaneously or in sequence and including a pair of coaxial, relatively rotatable shafts and a manually operable element operatively connected to said shafts, said element being rotatable bodily about one axis and pivotally movable about another axis at right angles thereto.

2. In a dirigible light, the combination with a rotatably mounted member; of a second lamp-holding member rotatably mounted on said first member to turn thereon about a different axis; and means for effecting independent rotation of each of said members about its respective axis including an arm rigid with said first named member, a shaft coaxial with said arm and mounted for rotation relatively thereto and a manually operable element connected to said arm and shaft respectively, said element being rotatable bodily about the axis of and with said arm and pivotally movable about an axis transverse to the axis of said arm.

3. In a dirigible light, the combination with a member rotatably mounted and having a rigid arm extending therefrom and about the axis of which said member is rotatable; of a second lamp holding member rotatably mounted on said first member to turn thereon about a different axis; and means for effecting independent rotation of each of said members about its respective axis including, a manually operable element rotatable bodily about the axis of and with said arm and pivotally movable about an axis transverse to the axis of said arm, a segmental gear rigid with said element, and a gear cooperable with said segmental gear.

4. In a dirigible light, the combination with a member having a rigid arm extending therefrom and rotatable about the axis of said arm; of a second lamp-holding member rotatably mounted on said first member to turn thereon about a different axis; means for rotating said first member and arm about the axis of the latter; and means for rotating said second member about an axis including, a gear rigid with said second member, a second gear meshing with the first gear, said last named gear being rotatably mounted on said first named member on an axis at an angle to the axis of rotation of said member, a bevel gear rotatable in unison with said second gear, and a second level gear cooperable with the first bevel gear.

5. In a dirigible light, the combination with a hollow head having a rigid hollow arm extending therefrom, said head being rotatable about the axis of said arm; of a lamp-holding member rotatably mounted on said head about an axis transverse to said first named axis; a gear rigid with said holding member and located within said head; a second gear within said head meshing with said first gear; a bevel gear rotatable with said second gear; a second bevel gear rotatable about said first named axis and meshing with said first named bevel gear; and means extending through said arm for imparting rotation to said second named bevel gear.

6. In a dirigible light, the combination with a member having a rigid arm extending therefrom, said member being rotatable about the axis of said arm; a second lamp-holding member rotatably mounted on said first member to turn thereon about a different axis; and means for effecting independent rotation of each of said members about its respective axis including, a shaft extending through and rotatable within said arm, a handle rotatable with said arm about the axis of the latter, said handle being also pivotally mounted with respect to said arm, a segmental gear rigid with said handle and oscillatable therewith, and a gear carried by the end of said shaft adjacent said segmental gear and cooperable with the latter.

7. In a dirigible light, the combination with a member having a rigid arm extending therefrom, said member being rotatable about the axis of said arm; a second lamp-holding member rotatably mounted on said first member to turn thereon about a different axis; means for effecting independent rotation of each of said members about its axis and including a head at the free end of said arm rigid therewith; electric wiring, including a switch located within said head, for completing an electric circuit to an electric lamp bulb carried by said lamp-holding member; and a switch lever located outside of the said head for adjusting the position of said switch.

8. In a dirigible light, the combination with a support; of a member having a rigid hollow arm extending laterally therefrom and rotatable about the axis of said arm on said support; a second lamp-holding member rotatably mounted on said first member about an axis transverse to said first axis; and means for effecting independent rotation of each of said members about its respective axis including, a head secured to the free end of said arm and rotatable with the latter, a shaft extending through and rotatable within said arm, gearing within said first named member operatively interposed between said second named member and the adjacent end of said shaft, a lever pivotally mounted on said head and having a segmental gear movable in unison therewith within the head, and a gear carried by the adjacent end of said shaft cooperable with said segmental gear.

9. In a dirigible light, the combination with an adjustably mounted electric lamp holder including a rotatable arm; of a relatively fixed member through which said arm is extended; and means for completing an electric circuit with the electric lamp from an outside source of current including, a lead-in block carried by said fixed member, said block having a contact element carried thereby, a cooperable contact element carried by the extended end of said arm, one of said contact elements being shiftable in the direction of the length of said arm to thereby make and break the circuit between said contact elements.

10. In a dirigible light, the combination with an adjustably mounted electric lamp holding member including, a rotatable arm; of a relatively fixed member through which said arm is extended; means for completing an electric circuit with the electric lamp from an outside source of current including, a lead-in block carried by and rigid with said fixed member, a contact block slidably mounted on said lead-in block in a direction lengthwise of said arm, a cooperable contact member carried by the extended end of said arm, the circuit being adapted to be broken by shifting said slidable contact block.

11. In a dirigible light, the combination with an adjustably mounted electric lamp holding member including, a rotatable arm; of a relatively fixed member through which said arm is extended; means for completing an electric circuit with the electric lamp from an outside source of current including, a lead-in block rigidly mounted on said fixed member, a block slidably mounted on said lead-in block and having an annular contact ring, a contact pin carried by the extended end of said arm and movable therewith during rotation of said arm, said pin cooperating with said contact ring and the circuit being adapted to be made and broken by shifting said slidable block.

12. In a dirigible light, the combination with an adjustably mounted electric lamp holder and means for adjusting said holder, said holder carrying a reflecting mirror; of an electric lamp bulb yieldingly supported within said holder; and means for adjusting the focus of said lamp bulb including, a lever pivotally mounted within said holder and engaging the base of said bulb, and an adjusting screw extending from the exterior to the interior of said holder and engageable with said lever.

13. In a dirigibly mounted light, the combination with a supporting bracket; of a hollow housing having a hollow rigid arm extending laterally therefrom and rotatably mounted within said bracket; of a block rigidly secured to the free end of said arm and rotatable in unison with the latter; a lamp holding member rotatably mounted on said housing about an axis perpendicular to the axis of rotation of said arm; a hollow shaft extending axially through said hollow arm; operative gearing between said lamp holding member and the adjacent end of said shaft; a handle lever pivotally mounted on said block to oscillate about an axis perpendicular to the axis of said arm; operative gearing between said handle lever and the adjacent end of said shaft to effect rotation of the latter upon oscillation of said handle lever about its axis; and means for completing an electric circuit to an electric bulb carried by said lamp holding member, said means including a switch having a finger control therefor adjacent said handle lever.

14. In an adjustable spotlight of the character described, the combination with an automotive vehicle having an enclosed superstructure including a windshield and a frame member therefor, said frame member having an opening therethrough; of bearing supporting means including a hollow block adapted to be secured in fixed position to the outer side of said frame member in alinement with said opening, and a hollow bearing arm extending from said block through said opening to the interior of the superstructure; a lamp holder proper; a hollow carrier to which said lamp holder proper is movably attached, said hollow carrier being rotatably mounted within said supporting means and being extended to the interior of the superstructure beyond the inner end of said hollow arm; means supported by said hollow carrier at said inner extended end thereof for effecting adjustment of said lamp holder; and connections extending between said means and said lamp holder, said connections extending within and through said hollow carrier and hollow arm where the latter pass through said frame member.

15. In an adjustable spotlight of the character described, the combination with an automotive vehicle having an enclosed superstructure including a windshield and a frame member therefor, said frame member having an opening therethrough; of bearing supporting means including, a hollow block adapted to be secured in fixed position to the outer side of said frame member in alinement with said opening, and a hollow bearing arm extending from said block through said opening to the interior of the superstructure; a lamp holder proper; a hollow carrier to which said lamp holder proper is movably attached, said hollow carrier being rotatably mounted within said supporting means and being extended to the interior of the superstructure beyond the inner end of said hollow carrier at said inner extended end thereof for effecting adjustment of said lamp holder, said carrier also having a sleeve-like section on the outer side of the superstructure telescoping over a portion of said block; and connections extending between said means and said lamp holder, said connections extending within and through said hollow carrier and hollow arm where the latter pass through said frame member.

16. In a dirigible light, the combination with a support; of a hollow housing having a hollow operating arm rigid therewith and rotatably mounted on said support; a lamp-holding member rotatably mounted on said housing having an axial extension within the housing; an electric lamp proper carried by said member; means for effecting rotation of said lamp-holder about its axis including a hollow shaft rotatable within said arm and gearing between said shaft and lamp-holder; and means for completing an electric circuit to said lamp including, a wire leading through said hollow shaft and terminating in an insulated contact point at the end thereof within the housing, a wire extending through said axial extension of the lamp-holder and terminating in an insulated contact point at the end thereof, and electric conductors within the housing completing the circuit between said contact points.

17. In a dirigible light, the combination with a support; of a hollow housing having a hollow operating arm rigid therewith and rotatably mounted on said support; a lamp-holding member rotatably mounted on said housing having an axial extension within the housing; an electric lamp proper carried by said member; means for effecting rotation of said lamp-holder about its axis including a hollow shaft rotatable within said arm and gearing between said shaft and lamp-holder; and means for completing an electric circuit to said lamp including, a wire leading through said hollow shaft and terminating in an insulated contact point at the end thereof within the housing, a wire extending through said axial extension of the lamp-holder and terminating in an insulated contact point at the end thereof, and electrical conductors within the housing completing the circuit between said contact points.

18. In a dirigible light mounting, the combination with a support; of a member rotatable thereon about one axis; a second member including a hollow spindle rotatably mounted on the first member about an axis transverse to the first axis; a hollow operating member rotatably mounted with respect to said first member on said first named axis; co-operable gears on said spindle and the adjacent end of said operating member; and means forming one side of an electric circuit to an electric lamp carried by said second named member, said means including, a wire within said operating member, an insulated contact pin carried axially by the operating member adjacent the gearing and electrically connected to said wire, a resilient contact member supported by said first named member and insulated therefrom and in electrical contact with said pin, an insulated contact pin carried axially by said hollow spindle and projected partly therefrom, and a contact brush engaging said last named contact pin, said brush being insulated from its support and electrically connected to said resilient contact member.

19. In a dirigibly mounted light, the combination with a supporting element adapted to be retained in fixed position; of supporting means including an arm extending through and rotatably mounted within said supporting element; a shaft extending through said arm and being rotatably mounted therein; actuating means for effecting rotation of said arm and shaft; contact means including a pin carried by and movable with said actuating means; a contact ring mounted on said fixed element and adapted to co-operate with said contact pin; and means for completing an electric circuit from said contact pin through said shaft to the light proper.

20. In a dirigibly mounted light, the combination with a supporting element adapted to be retained in fixed position; of light supporting means including an arm extending through and rotatably mounted within said fixed element; a shaft rotatably mounted within said arm; electric means including a contact pin carried by said arm; a contact ring mounted on said fixed element adjacent to and adapted to co-operate with said contact pin; a contact pin disposed axially with reference to said shaft; and means for establishing connection between said contact pins.

21. In a dirigible light, the combination with supporting means; of a hollow shaft rotatably mounted on said supporting means to rotate about one axis, said shaft being provided with conducting means extending therethrough and rotatable therewith; and a lamp carrying member upon which a lamp is adapted to be supported, said lamp carrying member being rotatable upon an axis extending at an angle to the axis of rotation of said shaft, said lamp carrying member and said shaft being rotatable relatively to each other upon their individual axes, said lamp carrying member being provided with an axially disposed conductor rotatable therewith and having electrical communication with the conducting means in said shaft.

22. In a dirigible spotlight, the combination with inner and outer concentric shafts, independently rotatable, said inner shaft being provided with conducting means rotatable therewith; means co-operating with said shafts at one end for effecting independent rotation thereof; a lamp and a carrying member, said lamp being movable about two axes disposed at an angle to each other, and said carrying member being provided with an axial conductor rotatable therewith, and having electrical communication with the conducting means in said inner shaft; and means co-operating with said inner and outer shafts and said lamp to effect movement of the latter upon either of its axes of rotation when said shafts are independently operated.

23. As an article of manufacture, an operating shaft for a dirigible spotlight comprising an elongated hollow element having contacts fixed in each end and insulated from said element and connected by conductor means extending through said element from contact to contact.

24. A dirigible spotlight, the combination with inner and outer concentric shafts, the inner of said shafts being provided at one end with a terminal contact; means for independently rotating said shafts, including a handle member detachably mounted and provided with a spring arm adapted to bear upon the terminal contact of said shaft when the handle member is in operating position, and being separable with respect thereto when said handle member is detached.

25. In a dirigible spotlight, the combination with a support; of concentric rotatable shafts mounted on said support; means for independently rotating said shafts; a lamp carrier connected with said outer shaft and adapted to rotate upon an axis disposed at an angle to the axis of rotation of said shaft, said carrier being operatively connected with the inner of said shafts; and conducting means for said spotlight, including a conductor disposed axially with reference to said lamp carrier, and conducting means contacting with said axial conductor and extending in a direction along said shafts from one side of said support to the other.

26. In a device of the character described, the combination with supporting means; of a hollow shaft rotatably mounted on said supporting means to rotate about one axis, said shaft being provided with conducting means rotatable therewith; a lamp carrying member upon which a lamp is adapted to be rotated on an axis independent of the axis of rotation of said shaft, said shaft being relatively movable with respect to said lamp carrying member, and operatively connected with said lamp, the lamp being provided with an axially disposed conductor; and conducting means engageable with the end portions of said shaft and the conductor in said lamp to complete a circuit through said shaft to said lamp.

27. In a device of the character described, the combination with supporting means; of a hollow shaft rotatably mounted on said supporting means to rotate about one axis, said shaft being provided with conducting means rotatable therewith; a lamp carrying member upon which a lamp is adapted to be rotated on an axis independent of the axis of rotation of said shaft, said shaft being relatively movable with respect to said lamp carrying member, and operatively connected with said lamp, the lamp being provided with an axially disposed conductor; conducting means engageable with the end portions of said shaft and the conductor in said lamp to complete a circuit through said shaft to said lamp; and means for independently rotating said lamp carrying member and said shaft.

28. As an article of manufacture, an operating member for a dirigible spotlight comprising an elongated hollow element having contacts fixed in each end thereof and insulated from said element, and connected by a conductor extending through said hollow element from contact to contact, and means on opposite end portions of said hollow element for co-action with movable parts of the spotlight.

29. In a dirigible light, the combination with a support; of a housing rotatably mounted to turn about one axis; a lamp mounted on said housing for rotation at an angle to the axis of rotation of said housing, and having a contact member rotatable therewith; a switch mounted on one side of said support opposite to the side on which said lamp is mounted; and a conductor having electrical communication with said switch extending through said support, through said housing and terminating in an insulated contact member engageable by the contact member rotatable with said lamp.

30. In a dirigible spotlight, the combination with a support; a lamp; operating members mounted on said support and connected at one set of ends with said lamp for moving the same about two axes disposed at an angle to each other when said operating members are actuated; a handle support rigidly but detachably secured to one of said members, said handle support having means carried thereby for actuating said operating members independently of each other, said handle support also having a switch carried thereby including a contact element; and a conductor extending through one of said operating members and communicating with said lamp, said conductor being engageable with the switch contact element in said handle support, when the latter is secured to the related operating member, and being detachable with respect thereto when said handle support is detached from said operating member.

31. In a dirigible spotlight, the combination with a support; of a pair of concentric shafts mounted on said support; a lamp; means connecting said lamp with said shafts at one set of ends of the latter whereby rotation of said shafts effects movement of said lamp about axes disposed at an angle to each other; a handle support rigidly but detachably secured to the outer of said shafts; operating means carried by said handle support and detachably connected with operating means at the opposite end of said inner shaft; a switch carried by said handle support and provided with a contact; and a conductor carried by said inner shaft adapted to engage with said switch contact when said handle support is in operative position and being detachable when said support is removed, said conductor being carried by said inner shaft and extending therethrough and communicating with said lamp.

32. In a dirigible light, the combination with relatively fixed supporting means; of a shaft rotatably mounted on said means to turn about one axis; a light-carrying member rotatably supported adjacent said shaft to turn about a different axis from said shaft; means for effecting independent rotation of said shaft and carrying member about their respective axes, said means including a swingable handle support rigid with said shaft; and a handle mounted on said support for swinging the same, said handle also having movement relative to said support; an adjustable friction brake operating between said handle and handle support; and an adjustable friction brake carried by said fixed supporting means and bearing on said shaft.

33. In a dirigible light, the combination with relatively fixed supporting means; of a shaft rotatably mounted on said means to turn about one axis; a light-carrying member rotatably movable about an axis disposed at an angle to the axis of rotation of said shaft; means for effecting independent rotation of said shaft and carrying member about their respective axes, said means including a second shaft within the first named shaft and operatively connected at one end to said light-carrying member and a handle support rigid with said first shaft; a handle mounted on said support and adapted to swing the same, said handle being movable relatively to said handle support; gearing between said handle and the adjacent end of said second-named shaft; a switch carried by said handle support; and means providing an electric circuit for said light, said means including a conductor extending through said second shaft to said light and being grounded on the light structure, said conductor being operatively connected with said switch and a source of electrical energy.

34. In a dirigible light, the combination with a windshield structure of a closed type of vehicle; a plurality of concentrically disposed rotatable tubular members; a lamp carrying member rotatable about an axis disposed at an angle to the axis of rotation of said tubular members; means operatively connecting the inner and outer tubular members and said light-carrying member to effect rotation of the latter by independent rotation of said tubular members; a supporting bracket having means disposed about said tubular members; said inner tubular member, outer tubular member, lamp-carrying member and bracket being assembled as a unit prior to application to operative position, said inner tubular member and outer tubular member being insertable as a unit through a bore in said windshield structure, and said bracket being adapted to be rigidly secured to the outer surface of said structure, said inner and outer tubular members projecting inwardly beyond said structure an appreciable distance, a second independent bracket slidably fitting over said outer tubular member and having means for supporting the same, said bracket being adjustable longitudinally with reference to said tubular members to accommodate windshield structures of different cross-sectional thicknesses, and being attachable to the windshield structure independently of the other bracket to support said tubular members at the inner side of said structure; and an operating unit for effecting independent rotation of said tubular members about their respective axes, said unit including a handle support telescopically and rigidly connected to the inner end of said shaft, and a handle at right angles to the longitudinal axis of said shaft and being movable relative to said handle support; and means connecting said handle with said inner tubular member for effecting rotation of the latter when movement is imparted to the former.

35. In a dirigible spotlight, the combination with a support; a lamp; operating members mounted on said support and connected at one set of ends with said lamp for moving the same about axes disposed at an angle to each other when said operating members are actuated; a handle support rigidly but detachably secured to one of said members, said handle support having means carried thereby for actuating said operating members independently of each other, said handle support also having a contact element carried thereby and adapted to be connected with a switch; and conducting means extending through certain of said operating members and communicating with said lamp, said conductor being carried by said members and being engageable with the contact and said handle support when the latter is secured to the operating members, the contact and said handle support and the conductor carried by said operating members being separable with respect to each other when said handle support is detached from said operating members.

36. In a dirigible light, the combination with relatively fixed supporting means including a tubular bearing sleeve; of a hollow shaft rotatably mounted within said tubular bearing sleeve; a second shaft rotatably mounted within said first named shaft; a relatively fixed contact ring insulated from and mounted on said bearing sleeve; a handle supporting member rigid with said first named shaft on the end of the shaft adjacent the contact ring; a handle mounted on said support and projecting at an angle thereto, said handle being movable relatively to said support; gearing connecting said handle and said second-named shaft; a contact pin carried by said handle supporting member and cooperable with said contact ring; an electrical conductor mounted within said second named shaft; and a switch carried by said handle supporting member spaced from said handle and having electrical contact with said pin and said conductor.

37. In a dirigible light structure of the character described, the combination with a relatively fixed support; of a shaft member carried by said support and rotatable about one axis; a lamp carrying member rotatable about an axis disposed at an angle to the first named axis; means for rotating said shaft and lamp carrying members about their respective axes; an electrical conductor extending through said rotatable shaft; an insulated annular contact ring; a spring-pressed pin carried by one of said members and engaging said ring during relative rotation of said member with reference to said ring; a switch; and means for completing an electric circuit through said ring and switch and a source of electrical energy, said means including as a part of the circuit a portion of the light structure upon which one pole of the circuit is grounded.

38. In a dirigible light, the combination with a lamp proper; of means for supporting and operating said lamp, including rotatable actuating mechanism for imparting movement to said lamp proper: means for completing an electric circuit with said lamp proper from an outside source of current including, a lead-in mechanism and a contact mechanism associated with said supporting and operating means, one of said mechanisms being provided with a contact ring, and a contact pin carried by the other mechanism, said pin being engageable with said ring during relative rotation between the parts, said mechanisms being relatively movable along said supporting and operating means to thereby make and break the circuit between said contact ring and pin.

In witness that I claim the foregoing, I have hereunto subscribed my name this 21st day of March, 1928.

CLIFFORD SKLAREK.